Figure 1:
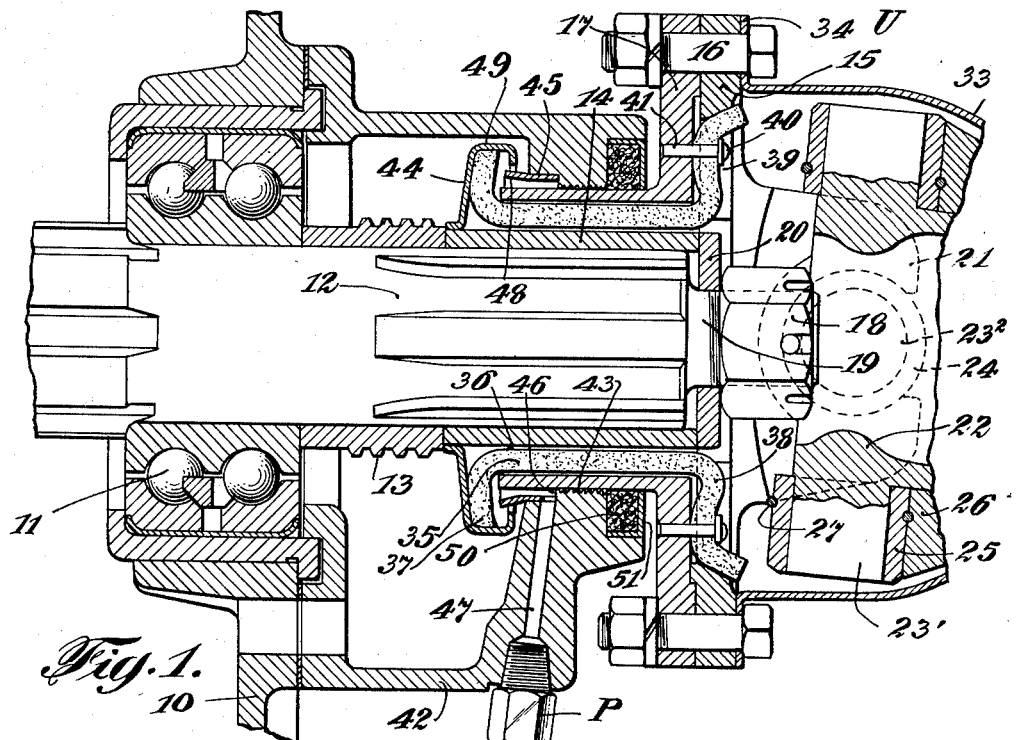

Jan. 21, 1930.  J. BIJUR  1,744,155
TRUNNION JOINT LUBRICATION
Original Filed Aug. 8, 1924

INVENTOR
Joseph Bijur
BY Dean, Fairbank,
Ohright + Hirsch
his ATTORNEYS

Patented Jan. 21, 1930

1,744,155

UNITED STATES PATENT OFFICE

JOSEPH BIJUR, OF NEW YORK, N. Y., ASSIGNOR, BY MESNE ASSIGNMENTS, TO AUTO RESEARCH CORPORATION, A CORPORATION OF DELAWARE

TRUNNION-JOINT LUBRICATION

Application filed August 8, 1924, Serial No. 730,795. Renewed April 8, 1929.

My present invention relates to lubrication and more especially to the lubrication of one or both of the universal joints of the propeller shaft assembly of a motor vehicle power transmission although the invention has a broader field of application to the lubrication of universal joints and transmission elements in other relations and for other uses.

The trunnion bearings of universal joints of certain types revolve with the casing or enclosing structure that retains the lubricant therefor, so that these devices do not present as do joints or bearings of other types, any stationary mount for direct application of a source of lubricant or of the outlet end of a lubricant supply pipe.

Where it is attempted to transmit lubricant for the universal joint from a contiguous lubricated mechanism, as, for instance, from the transmission case to the forward universal joint of a propeller shaft assembly through the intervening drive shaft, there is likelihood of abstracting the lubricant too rapidly from the transmission case, so that the latter would have to be frequently replenished to prevent injury thereto, or if the outlet from the transmission case were so highly restricted as to prevent rapid draining, too little lubricant might be delivered for adequate lubrication of the universal joint.

It is accordingly an object of the invention to effect adequate lubrication of the universal joint without robbing the transmission case or other associated lubricated mechanism, and yet with substantially the same facility of operation as in the lubrication of ordinary bearings that have stationary bearing boxes, and more specifically to effect such lubrication without the need for opening or removing any closure of, or for any manual access to the joint, and without even the need for stopping the revolution of the joint while applying lubricant.

Among other objects are to provide a construction of the character set forth, in which the operation of the transmission train including the universal joint will not exert any strain or stress upon the lubricant supply appurtenances, and in which the lubricant may be delivered to the joint simultaneously with the lubrication of other bearings from a single source or point of control.

Among other objects are to lubricate the forward universal joint of the propeller shaft of a motor vehicle with oil from an external source without admitting any of said oil into the transmission case.

Another object is to effect the results noted without the need for revolving inlets, oil, or grease cups or projecting or exposed pipes or conduits and without exposing the lubricant either after or during admission, to dirt, dust or water.

The invention is carried into execution by providing the revolving universal joint structure with means for intercepting lubricant delivered thereto through a non-revolving inlet, apart therefrom. The preferred intercepting means is annular and may comprise a trough revolving with the driving forging and supplied from the inlet, which latter is preferably in a fixed collar about the terminal sleeve of the universal joint. In the application of the invention to propeller shafts and in equivalent relations the trough may replace and also perform the function of the usual oil throw plate mounted on the drive shaft within the transmission case or other associated lubricated mechanism. The lubricant is conveyed from the trough to the bearing surfaces in the universal joint through one or more wicks extending from the trough lengthwise either through corresponding bores in the driving hub or through the shaft end upon which the hub is mounted, the wick preferably extending radially outward into the universal joint.

To the extent that the invention disclosed in the present application is not limited to the use of one or more wicks or the equivalent thereof, the subject matter is claimed in my copending application Serial No. 18,092, filed March 25, 1925. The present application includes claims generic to Figs. 1 and 2 and others specific to Fig. 1. Claims specific to the embodiment of Fig. 2 are claimed in a divisional application Serial No. 363,455 filed May 16, 1929.

In the accompanying drawings on which are shown one or more of various possible embodiments of the several features of the invention, Fig. 1 is a fragmentary view in longitudinal section of one embodiment.

Figure 2:
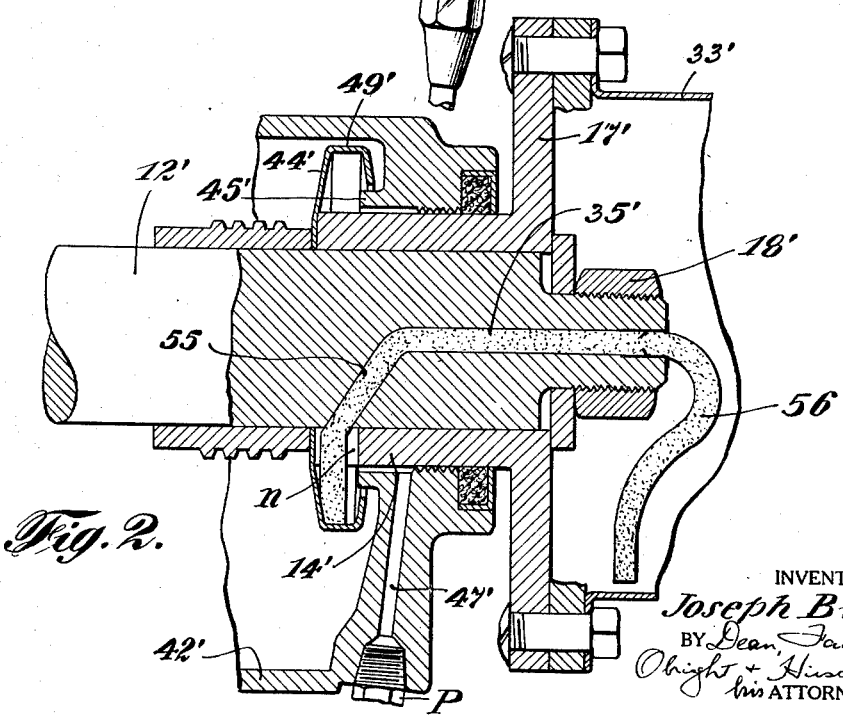

Fig. 2 is a view similar to Fig. 1 of a modified form.

Referring now to Fig. 1 of the drawings, I have shown in general outline, a fragment of the gear or transmission case 10 of a motor vehicle having a ball bearing 11 in the rear end thereof for the protruding shaft 12 upon which is illustratively shown a worm sleeve 13 for driving a speedometer (not shown). The terminal sleeve 14 for the forward universal joint U is splined to shaft 12, as shown.

The general construction of universal joint in this embodiment is of familiar type and comprises an annular mounting or base plate 15 bolted as at 16 to the flange 17 of the mounting terminal, the latter secured against coming off the shaft by a nut 18, threaded, and preferably locked upon the end of the shaft projection 19 against a metal washer 20 which coacts with the end of sleeve 14. The mounting flange has diametrically opposite yokes 21 for a trunnion ring 22 provided with four bearing lugs at intervals of a quadrant, one pair of diametrically opposite lugs 23² bearing in bushings 24 positioned in the yokes 21, the other pair of bearing lugs 23′ extending into bushings 25 in a corresponding yoke 26 of the driven forging.

The bushings 24 and 25 are of diameter larger than the open length between the arms of yokes 21 and 26, which length, in turn, exceeds the diameter of studs 23, so that in assembly, the bearing lugs 23² of the trunnion ring are inserted between the arms of the yoke by movement toward the base plate, whereupon the bushings are inserted over the ends of the bearing studs and locked in place by lock rings 27, fitting in corresponding peripheral grooves about the bushings, and the bearings 23′ are then similarly assembled with respect to the driven forging 26. The driven forging 26 is formed integral with a terminal sleeve (not shown) that has a splined or driving connection with the correspondingly splined shaft head (not shown).

A generally spherical sheet metal shell 33 about the joint U has a flange 34 secured in place against the base plate 15 of the universal by the bolts 16, and coacts at its open end with a complementary spherical segment shell member (not shown).

According to my invention, the familiar construction set forth is modified to render possible the supply of lubricant thereto from the exterior, without the need for disassembly of the universal and without inconvenience of any sort, such as even the need for manual access at the universal.

For this purpose the driving hub 14 of the universal joint is formed preferably at the end thereof remote from the joint with lubricant intercepting means, in the form of a coaxial annular trough with its concavity at the inner periphery thereof. This element may comprise a stamped metal collar friction-fitted over the end of the hub most remote from flange 17. One or more lengths of wick 35 extend through corresponding longitudinal bores 36 in the hub protruding at one free end 37 thereof, radially outward into contact with the annular floor of the trough and at its other end 38 radially outward within the enclosed part of the universal joint in contact with the mounting flange 17 and into corresponding slots 39 in the plate 15. A clip 40 encircles each of the wicks and is secured in position by a rivet 41 to maintain the wicks against creeping or whipping. It is preferred to employ about four of the wicks at intervals of a quadrant, only two being shown in the drawings.

A preferred construction for delivering lubricant to the annular trough comprises an appropriate stationary lubricant inlet fitting P in the housing or collar 42, which encircles hub sleeve 14 and which is secured to the rear of the transmisison case. The housing or collar has the usual grooves 43 which tend to prevent escape therebeyond of lubricant leaking from the transmission case 10.

A stamped metal flaring sleeve guide 45 friction-fitted into a corresponding counterbore 46 in the collar 42 is supplied from the bore 47 and its outwardly flaring rim 48 drains into the trough 49, formed as an integral part of plate 44, and extending therefrom toward the universal joint.

In operation, lubricant admitted through the inlet fitting P will pass through bore 47 along guide 48 and into the lowermost part of the trough 49. If the joint is stationary during this operation, the lubricant will be drawn by a combined capillary and siphoning action up through the end 37 of the lowermost wick 35, thence lengthwise of the wick to drip from the longer end 38 thereof, which extends below the trough, into the universal joint. Should the lubricant be admitted through the stationary fitting P while the joint is in rapid rotation, the lubricant will pass in the manner heretofore described to the rapidly spinning trough 49. The wet delivery ends 38 of the wicks will by centrifugal action shed lubricant into the joint, while the inner ends 37 tend to drain into the trough by centrifugal force. As the spinning joint decelerates and approaches rest, the inner wick ends 37 will draw lubricant from the trough, excess lubricant dripping from the end 38 of the lowermost wick to the joint. The lowermost wick 35 after the joint has come to rest, moreover, tends by a capillary and siphoning action in the manner heretofore described to withdraw some or all of any residue of lubricant from the trough, and to drip from the free end thereof into the joint. Under various conditions of operation, it will be understood that a residue of lubricant will ordinarily be retained by the intermediate or longitudinal segment of the wick or wicks.

An annular felt packing 50 preferably fits in a corresponding counterbore in the end of the collar 42 and is pressed by a metal backing 51 into tight engagement with the hub, said packing serving to exclude dirt, dust or water from the path of the lubricant and further aiding in preventing possible escape of lubricant from the trough to the road.

Such lubricant as passes from the transmission case past ball bearing 11, is confined within collar or housing 42. The plate 44 operates as an oil thrower to prevent such lubricant from reaching the interior of the trough structure.

The present construction is easily produced without material modification in standard constructions of universal joints now in common use, by providing merely the bores 36 inserting and affixing the wicks 35 substituting for the usual oil throwing plate the sheet metal trough plate 44, 49, boring the collar or housing 42 as at 47 and providing sheet metal guide sleeve 45. The construction operates to reliably effect the lubrication without draining the transmission case.

Although the invention has a desirable application in the relation shown for lubricating the forward universal joint of a propeller shaft assembly, it will be understood that it is not limited to such application, but may be applied also to the rear universal or to universal joints or similar constructions in power transmissions generally. It will also be apparent that lubricant supplied to the forward universal joint of a propeller shaft assembly in the manner disclosed could be delivered in part rearward along the propeller shaft to the rear universal joint in the manner set forth in my copending application 18,092, filed March 25, 1925, or in my prior copending application Serial No. 720,927, filed June 19, 1924. It is also seen that the slide shaft, (not shown) associated with the universal joint may be lubricated therefrom in the manner disclosed in my said copending application.

In Fig. 2 is shown an alternative construction in which the metallic structural parts are substantially identical with those described in Fig. 1, similar parts being designated by corresponding reference numerals primed, however, except that instead of the plurality of wicks extending longitudinally through the hub structure, a single wick 35' extends from the trough 44' generally radially inward through a corresponding notch n in the end of the hub diagonally inward as at 55 through the driving shaft 12' and axially of said driving shaft as at 35' through the extreme end thereof, the free end 56 of the wick drooping downward in the stationary device to near the bottom of the universal joint enclosure 33'. Illustratively also, I have shown in this construction instead of the sheet metal guide sleeve 45 a guide flange 45' cast integral with the collar 42' and conveying the lubricant from the bore 47' to the trough 49'. There being in this embodiment but a single wick 35' which if of the same diameter would not withdraw the lubricant from the trough as rapidly as would the multi-wick construction shown in Fig. 1 the trough is formed with a deeper lubricant containing chamber and is of correspondingly larger diameter, as shown.

In this embodiment, as in the last, it will be seen that lubricant is not abstracted from the transmission case, for the purpose of supplying the universal joint and lubricant leaking from the transmission case does not reach the wick.

The invention is not limited in the application to the type of universal joint to which it is shown illustratively applied, but may be embodied in universal joints of other types. Certain of the features are also more broadly applicable to devices of types other than universal joints; for instance, to swivel joints.

I claim:—

1. In apparatus of the character described, in combination, revolving structure including shafts, an interposed universal joint in torque transmitting relation therewith, annular oil intercepting means encircling one of said shafts and revolving therewith, a wick revolving with said structure and connecting said annular means with the bearings of the universal joint, and a lubricant inlet conduit apart from the revolving structure and delivering to said oil intercepting means.

2. The combination with a lubricated mechanism, of a shaft protruding therefrom, a universal joint having a hub in driving relation therewith, means substantially preventing escape of lubricant from said mechanism, a lubricant inlet between said mechanism and said joint, a wick extending through the revolving structure and protruding at its opposite end into the joint, and an annular means coaxial with said hub supplied from said inlet, and supplying said wick.

3. The combination with a lubricated mechanism, of a shaft protruding therefrom, a universal joint having a hub in driving relation therewith, means substantially preventing escape of lubricant from said mechanism, a lubricant inlet between said mechanism and said joint, an annular trough member revolving with said hub, intercepting lubricant from said inlet and a wick dipping at one end into said trough and extending through the revolving structure and protruding at its opposite end into the joint.

4. The combination set forth in claim 3 in which the end of the wick at the joint moves through a larger radius than the end at the trough.

5. The combination with a lubricated mechanism, of a shaft protruding therefrom, a universal joint having a hub in driving relation therewith, means substantially preventing escape of lubricant from said mechanism, a collar fixed to the casing of said mechanism and encircling said hub, an inlet bore through said collar, an annular trough revolving with said hub and enclosed by said collar, means directing the lubricant from said inlet into said trough and a wick dipping at one end into said trough and extending through the revolving structure and protruding at its opposite end into the joint.

6. The combination with a lubricated mechanism, of a shaft protruding therefrom, a universal joint having a hub in driving relation therewith, means substantially preventing escape of lubricant from said mechanism, an annular trough revolving with the hub, coaxial therewith, and near the end thereof adjacent the lubricated mechanism, the rim of said trough extending toward the universal joint, a fixed lubricant inlet leading toward said hub, and a wick dipping at one end into said trough, extending lengthwise of the revolving structure and protruding at its other end into the universal joint.

7. The combination with a lubricated mechanism, of a shaft protruding therefrom, a universal joint having a hub in driving relation therewith, means substantially preventing escape of lubricant from said mechanism, a sheet metal annular trough revolving with the hub, friction-fitted with respect thereto and coaxial therewith, and near the end thereof adjacent the lubricated mechanism, the rim of said trough extending toward the universal joint, a fixed lubricant inlet leading toward said hub, a guide sleeve directing the lubricant from said inlet to said trough, and a wick dipping at one end into said trough, extending lengthwise of the revolving structure and protruding at its other end into the universal joint.

8. The combination with a lubricated mechanism, of a shaft protruding therefrom, a universal joint having a hub in driving relation therewith, means substantially preventing escape of lubricant from said mechanism, a collar fixed to the casing of said lubricated mechanism and encircling said hub, an inlet bore through said collar, an annular trough coaxial with said hub revolving therewith and enclosed by said collar, means directing the lubricant from said inlet into said trough, and one or more wicks dipping at one end into said trough and extending lengthwise of said hub at the exterior of said shaft to deliver into said universal joint.

9. The combination with a lubricated mechanism, of a shaft protruding therefrom, a universal joint having a hub in driving relation therewith, means substantially preventing escape of lubricant from said mechanism, a collar fixed to the casing of said mechanism and encircling said hub, an inlet bore through said collar, an annular trough revolving with said hub and enclosed by said collar, means directing the lubricant from said inlet into said trough, and a wick dipping into said trough and extending inward through said hub and into said shaft, thence lengthwise through the end of said shaft to deliver into the universal joint structure.

10. As an article of manufacture, a forging for a universal joint including a hub, one or more wicks extending through longitudinal bores in said hub and protruding outward substantially radially from both ends of said hub, and an annular trough rigid with said hub and extending about the wicks at one end thereof.

11. As an article of manufacture, a forging for a universal joint including a hub, one or more wicks extending through longitudinal bores in said hub and protruding outward substantially radially from both ends of said hub, and an annular trough rigid with said hub and extending about the wicks at one end thereof, and means attaching the other ends of said wicks with respect to the forging.

12. In combination, a torque transmitting universal joint having bearings, a lubricant retaining structure therefor revolving therewith through a path of larger radius than the path of revolution of said bearings, a fixed lubricant inlet conduit extending inward toward the axis of revolution and one or more wicks supplied from said inlet and leading to said bearings from within the outer periphery of the path of revolution of said retaining structure.

13. In apparatus of the character described, the combination of a revolving structure including a pair of shafts, an interposed universal joint in torque transmitting relation therebetween, a wick revolving with said structure, having its inner end leading into the universal joint, a lubricant inlet conduit apart from the revolving structure and delivering lubricant to said wick at a region near the outer end thereof, and oil intercepting means associated with the outer end of said wick and serving to maintain in contiguity with said wick end lubricant otherwise ejected from said wick end by centrifugal action during operation.

Signed at New York, in the county of New York and State of New York, this fifth day of August, A. D. 1924.

JOSEPH BIJUR.